June 16, 1925.  1,542,185
A. H. SWEET
BRAKE BAND
Filed April 30, 1923
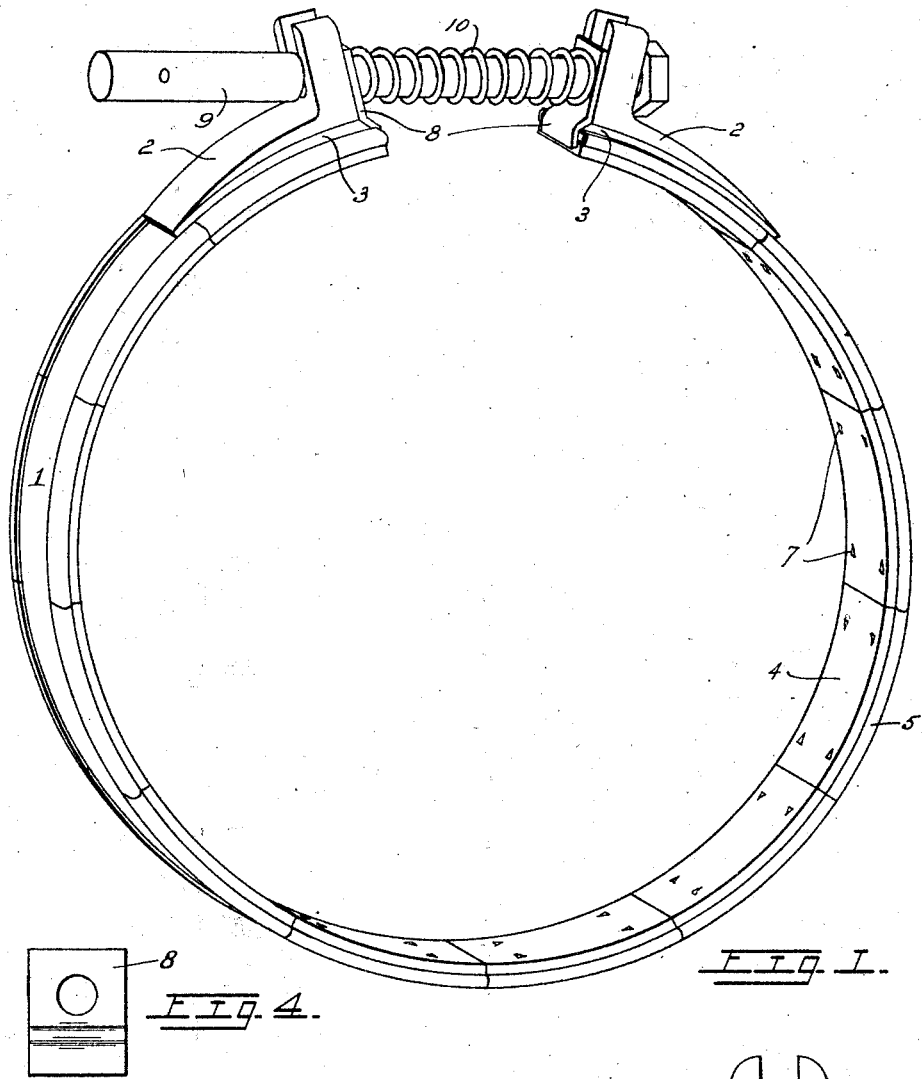
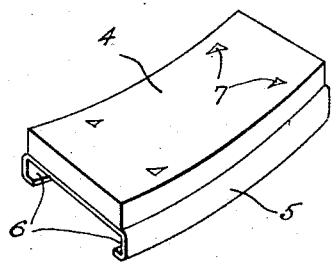
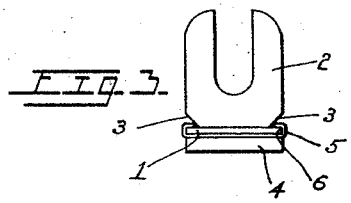
Inventor;
Alvin H. Sweet,
per N.W. Crandall
Attorney.

Patented June 16, 1925.

1,542,185

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND.

Application filed April 30, 1923. Serial No. 635,552.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to improvements in brake bands and particularly when they are housed or relatively inaccessible for relining. The objects of my improvement are, first, to provide a sectional lining that may be removed from or applied to a brake band without disassembling or removing it from its normal position; and, second, to afford facilities for renewing only a portion of the lining, and for arranging portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1 is a perspective view of my improved band; Figure 2 is a perspective view of one of the lining sections by itself; Figure 3 is an end elevation of one extremity of the band with the tightening bar and its attachments removed; and Figure 4 is an end elevation of one of the perforate plates used to prevent circumferential movement of the lining after it is in place.

Similar numerals refer to similar parts throughout the several views.

The brake band strap 1 may be of any usual and suitable form except that, where the width of end clips 2 is the same or nearly equal to the width of the strap, their inner edges adjacent the strap are chamfered as at 3. This is to expose the edges of the strap to afford facilities for engagement by the lugs of the lining sections.

The lining comprises a plurality of sections of friction material 4 with metallic backers 5. The latter are preferably made of sheet steel, with their edges bent outwardly and flanged so as to provide channels 6 adapted for engaging the respective edges of the brake strap. Clinch points are pressed inwardly from the material of the backers, and the frictional material is attached by means of these points as indicated as 7 in Figs. 1 and 2.

The lining is applied by slipping the sections on the end of the strap and sliding them around circumferentially. The sections are retained in place by means of a pair of perforate bent plates 8 on the tightening bar 9. These are separated by a helical compression spring 10 which also acts to expand the band when the operating lever is released. Worn sections of lining can be removed or placed in other positions at will, without the necessity for discarding the lining as a whole.

The construction and operation of the invention will be clear from the foregoing description. It will also be obvious that the lining is flexible and otherwise perfectly adapted for braking purposes.

In previous applications I have shown somewhat similar brake band constructions, but none of these claim what is claimed herein;

I claim:

A brake band having a lining comprising a plurality of independent sections adapted for engaging the edges of said band and for circumferential sliding therewithin; and a pair of perforate plates spaced by a helical compression spring mounted on the tightening bar of said band; said plates extending inwardly over the respective ends of said lining to prevent circumferential movement of the latter with respect to said band.

ALVIN H. SWEET.